July 28, 1953  A. T. SCHEIWER  2,646,998
COUPLING DEVICE FOR TESTING COILS AND THE LIKE
Filed May 24, 1947
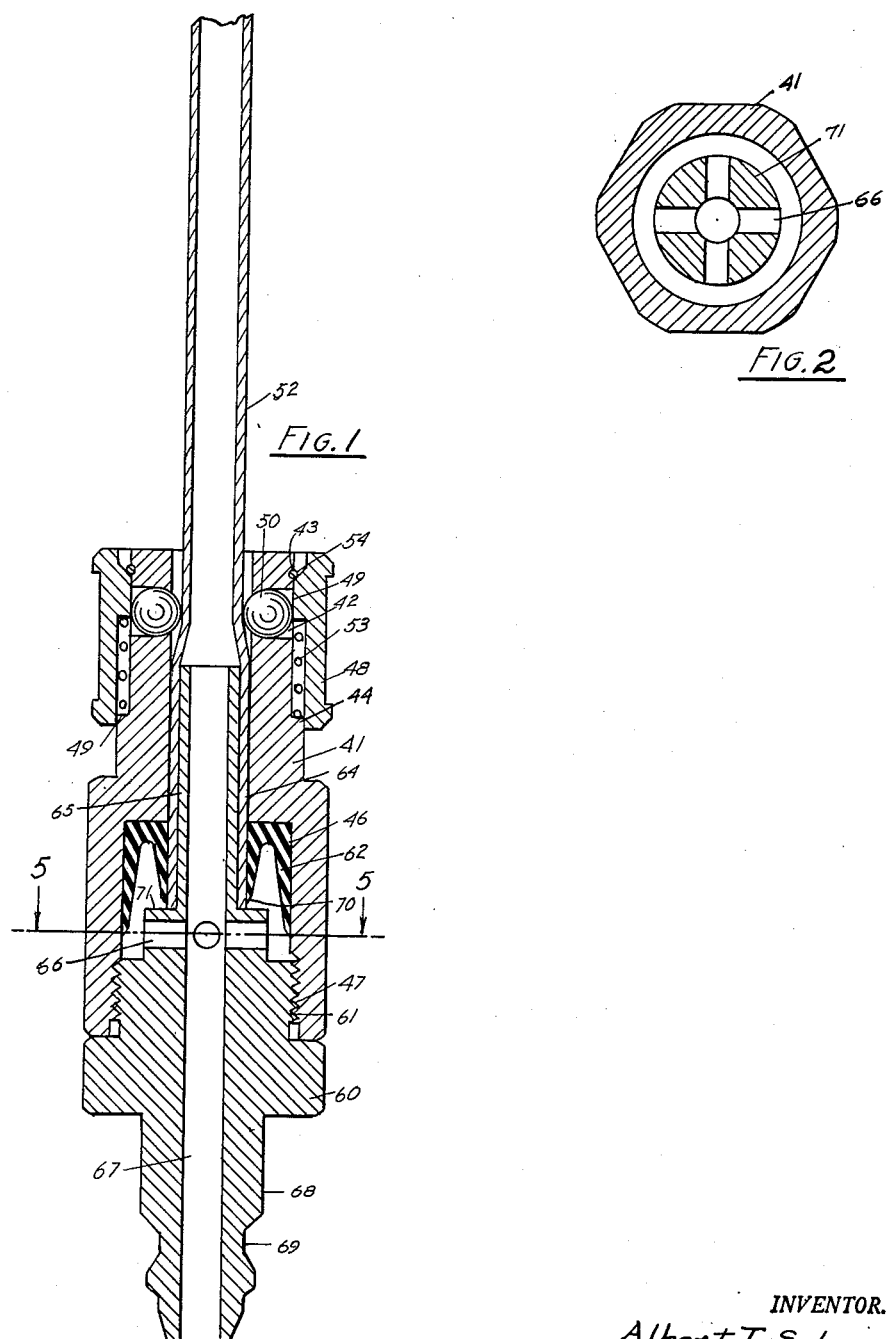
INVENTOR.
Albert T. Scheiwer
BY Patented July 28, 1953

2,646,998

UNITED STATES PATENT OFFICE 2,646,998

COUPLING DEVICE FOR TESTING COILS AND THE LIKE

Albert T. Scheiwer, Erie, Pa.

Application May 24, 1947, Serial No. 750,348

2 Claims. (Cl. 285—169)

This invention relates generally to coupling devices for connection to the end of an open end tubular member and it relates more particularly to coupling members for connection to the end of a tubular member or coil wherein the tubular member may be tested.

Heretofore there has been much difficulty in making a connection to the open end of a tubular member for testing purposes in that in many cases the tubular member was flattened in making the connection and many times the end was broken. With these prior connections there has been leakage and much time and labor has been necessary in order that individual connections could be made. In all cases testing of tubular members such as coils for refrigerators is a major part of the cost of the coil and inasmuch as every coil which goes into a refrigerator must be tested, some means for making a quick connection for testing purposes is desirable.

It is, accordingly, and object of my invention to provide a coupling member for connection to the end of an open end tubular member which is simple in construction, economical in cost, easy to connect, economical in manufacture, and efficient in operation.

Another object of my invention is to provide novel coupling means for connection to the end of an open end tubular member which has means for making a snap connection to a coupling on a hose supplying fluid for testing the tubular member.

Another object of my invention is to provide novel coupling means for the flared end of a tubular member.

Another object of my invention is to provide coupling means for connection to the open end of a tubular member having a male member connected therewith for connection to a source of fluid and also a check valve therein.

Other objects of my invention will become evident from the following detailed description, taken in conjunction with the accompanying drawings, in which:

Fig. 1 is a vertical sectional view of a modified form of coupling member for connection to the flared end of an open tubular member; and Fig. 2 is a view taken on the line 5—5 of Fig. 1.

Figs. 1 and 2 show a coupling member for the flared end of a tubular member to be tested inasmuch as a great number of the tubular members are flared on the ends thereof for ease in connecting tubular members together. The coupler shown in Fig. 1 comprises a sleeve 41 having ball retaining apertures 42, a peripheral groove 43, a shoulder 44, and internally recessed washer groove 46, and an internally threaded portion 47. A locking sleeve 48 is telescopically disposed on the sleeve 1 and it has a camming portion 49 for forcing ball members 50 in ball retaining apertures 42 of the member 41 in locking engagement with the flared end of a tubular member 52 as shown in Fig. 1. Spring member 53 urges the locking sleeve 48 in locking engagement with the ball members 50 and against the stop clip 54 disposed in the peripheral groove 43 of the member 1. A male member 60 has an externally threaded portion 61 for threadable engagement with the internally threaded portion 47 of the member 41. A V-shaped washer 62 is disposed in the washer recess 46 of the member 41 to sealingly engage the flared end 64 of tubular member 52. The male member 60 has a supporting and guiding portion 65 having the same outside diameter as the inside diameter of the flared portion 64 of the tubular member 52. Laterally extending apertures 66 in extending portion 71 extend outwardly from the longitudinally extending aperture 67 in the male member 60. The male member 60 has a connecting portion 68 with a peripheral groove 69 for connection to any conventional ball-type female coupling member now on the market. The members 41 and 60 preferably have external wrench engaging surfaces.

In operation of my novel coupling member, the locking sleeve 48 is moved longitudinally on the sleeve 41 to free the ball members 50 wherein the flared end 64 of tubular member 52 is projected into the longitudinal aperture of the sleeve 41 and into engagement with the supporting sleeve 65 of the male member 60. The locking sleeve 48 is then released and the spring member 53 forces the ball members 50 into engagement with the shoulder portion 80 of the tubular member 12 thereby locking the tubular member 52 firmly with the coupling member. The V-shaped washer 62 sealingly engages the flared end 64 of the tubular member 52 to prevent leakage. Fluid passing outwardly through the laterally extending apertures 66 forces the inner leg 70 of the washer member 62 into sealing engagement with the flared end 64 of the tubular member 52. Any conventionel female coupling member may be attached to the connecting portion 68 of the male member 60 to supply fluid to the tubular member 52 for testing. This device provides a means for making a quick connection to the flared end of a tubular member and also permits quick disconnection thereby making the testing operation one of small cost and in a minimum of time. It will be evident that any conventional check valve may be disposed in the male member 60 if a check valve is desired to hold the fluid in the tubular member 52 for any length of time.

From the foregoing description it will be seen that I have provided novel means for making a quick connection to a straight end or a flared end of a tubular member or coil and a male coupling member is provided to make a quick connection to a conventional female coupling member of a snap-type coupling.

Various changes may be made in the specific embodiment of my invention without departing from the spirit thereof or from the scope of the appended claims.

What I claim is:

1. A coupling member for connection to the flared end of a tubular member comprising an axially bored cylindrical member, camming members carried by said axially bored cylindrical member, a male coupling member connected to one end of said axially bored cylindrical member, an outwardly extending supporting and guiding sleeve fixedly secured to said coupling member and disposed concentrically of said axial bore in said cylindrical member for engaging and supporting the inner surface of the flared end of said tubular member, and locking means for locking said camming members into engagement with the shoulder on said tubular member formed by the flared end thereof said locking means comprising a sleeve movable axially of said bored cylindrical body, said guiding and supporting means having an aperture therein and pressure actuated sealing means engaging said tubular member and said body member, said apertures being disposed to admit fluid from said axially bored portion to engage said sealing means.

2. The coupling member recited in claim 1 wherein said sealing means comprises a washer U-shaped in cross section.

ALBERT T. SCHEIWER.

References Cited in the file of this patent
UNITED STATES PATENTS

| Number | Name | Date |
|---|---|---|
| 373,256 | Traver | Nov. 15, 1887 |
| 761,950 | Dreifuss | June 7, 1904 |
| 1,063,131 | Maximilian | May 27, 1913 |
| 1,339,555 | Earl | May 11, 1920 |
| 1,490,760 | Black | Apr. 15, 1924 |
| 2,143,279 | Osborn | Jan. 10, 1939 |
| 2,377,812 | Scheiwer | June 5, 1945 |
| 2,437,543 | Le Clair | Mar. 9, 1948 |